United States Patent
Rameau et al.

(10) Patent No.: US 8,332,189 B2
(45) Date of Patent: Dec. 11, 2012

(54) COMPUTER-IMPLEMENTED METHOD OF DESIGN OF SURFACES DEFINED BY GUIDING CURVES

(75) Inventors: Jean-Francois Rameau, Lisses (FR); Jean Saloux, Paris (FR); Pascal Sebah, Paris (FR); David Bonner, Paris (FR); Michael Frey, Rheinmunster (FR)

(73) Assignee: Dassault Systemes, Velizy-Villacoublay (FR)

( * ) Notice: Subject to any disclaimer, the term of this patent is extended or adjusted under 35 U.S.C. 154(b) by 420 days.

(21) Appl. No.: 12/488,039

(22) Filed: Jun. 19, 2009

(65) Prior Publication Data

US 2010/0004770 A1  Jan. 7, 2010

(30) Foreign Application Priority Data

Jul. 4, 2008  (EP) .................................... 08290659

(51) Int. Cl.
*G06F 7/60* (2006.01)
*G06F 17/10* (2006.01)
*G06F 19/00* (2011.01)
*G06T 11/20* (2006.01)

(52) U.S. Cl. ................. 703/2; 345/442; 700/97; 700/98
(58) Field of Classification Search ........ 703/2; 700/98, 700/97; 345/442
See application file for complete search history.

(56) References Cited

U.S. PATENT DOCUMENTS

| | | | | |
|---|---|---|---|---|
| 5,636,338 | A * | 6/1997 | Moreton | 345/442 |
| 7,428,713 | B1 * | 9/2008 | Roux | 716/132 |
| 2004/0113910 | A1 * | 6/2004 | Tsai et al. | 345/420 |
| 2006/0212279 | A1 * | 9/2006 | Goldberg et al. | 703/2 |
| 2008/0033699 | A1 * | 2/2008 | Hioki | 703/1 |

OTHER PUBLICATIONS

Wang, Charlie, C. L. et al., "Optimal Boundary Triangulations of an Interpolating Ruled Surface", Jan. 4, 2006.*
Hou, Shujuan et al. "Multi-Objective Optimization of Multi-Cell Sections for the Crashworthiness Design", Mar. 20, 2008, International Journal of Impact Engineering 35, Elsevier Ltd.*
Zheng, Yong, "Enabling Computational Techniques for Tangential-Building Solid Freeform Fabrication", Aug. 1997, Department of Electrical Engineering and Applied Physics, Case Western Reserve University, pp. 64-71.*
Zheng, Y., "Enabling Computational Techniques for Tangential-Building Solid Freeform Fabrication," Department of Electrical Engineering and Applied Physics, Case Western Reserve University, 4:54-111 (1997).

(Continued)

*Primary Examiner* — Kandasamy Thangavelu
*Assistant Examiner* — Cedric D Johnson
(74) *Attorney, Agent, or Firm* — Hamilton, Brook, Smith & Reynolds, P.C.

(57) ABSTRACT

A computer-implemented method of design of ruled surfaces may comprise the step of accessing data defining guiding curves P(u) and Q(v) and a cost function $f(t,w)$. Given P(u) and Q(v), the unknown coupling is a parameterized curve s ↦ (t(s),w(s)). The method further comprises defining an objective function of the type $J=J(f,t,w)$, involving both $f(t,w)$ and coordinates t, w of the coupling curve. Then, optimizing the objective function J makes it possible to obtain the target coupling curve. Finally, a ruled surface $S(s,\lambda)=\lambda Q(w(s))+(1-\lambda)P(t(s))$ is provided, according to the guiding curves P(t(s)) and Q(w(s)), composed with the coordinates t,w of the coupling curve previously obtained. In addition, the objective function is further constrained at the optimization step such that arguments t,w of the cost function $f(t,w)$ are regulated by a regulation function μ.

20 Claims, 8 Drawing Sheets

OTHER PUBLICATIONS

Wang, C., et al., "Optimal Boundary Triangulations of an Interpolating ruled Surface," Journal of Computing and Information Science in Engineering, American Society of Mechanical Engineers, 5:291-301 (2005).

de Jager, P.J., et al., "An Effective Geometric and Kinematical Analysis of Ruled Surface Feature Manufacturability for Rapid Prototyping," Proceedings of DETC'01, ASME 2001 Design Engineering Technical Conferences and Computers and Information in Engineering Conference, Pittsburgh, P.A., 10 pages, Sep. 9-12, 2001.

Cohen, S., et al., "Matching of Freeform Curves," Computer Aided Design, 29(5):369-378 (1997).

Samanta, K., et al., "Feature-Based Material Blending for Heterogeneous Object Modeling," Department of Industrial Engineering, University of Buffalo, 4889:142-166 (2008).

European Search Report, Application No. EP 08290659.5 dated Dec. 9, 2008.

* cited by examiner

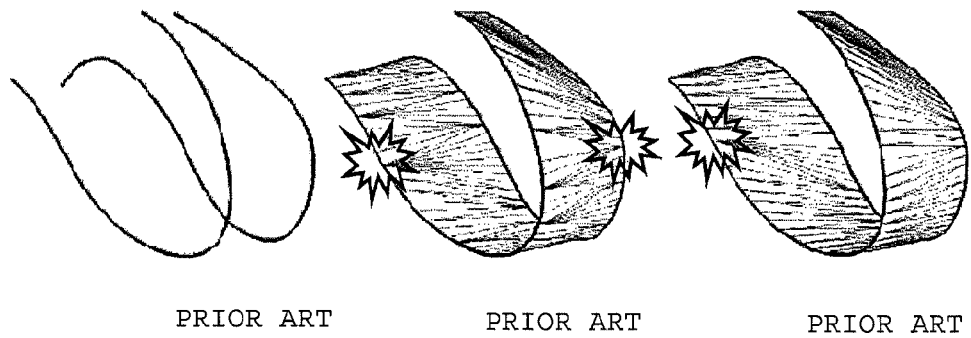
PRIOR ART
FIG. 1A
PRIOR ART
FIG. 1B
PRIOR ART
FIG. 1C
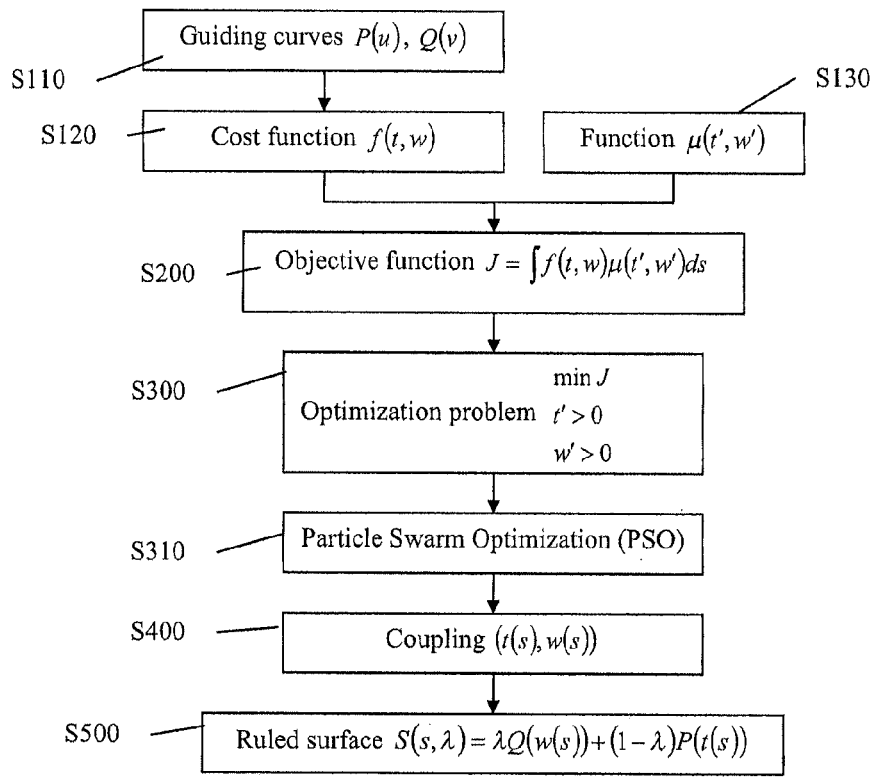
FIG. 2

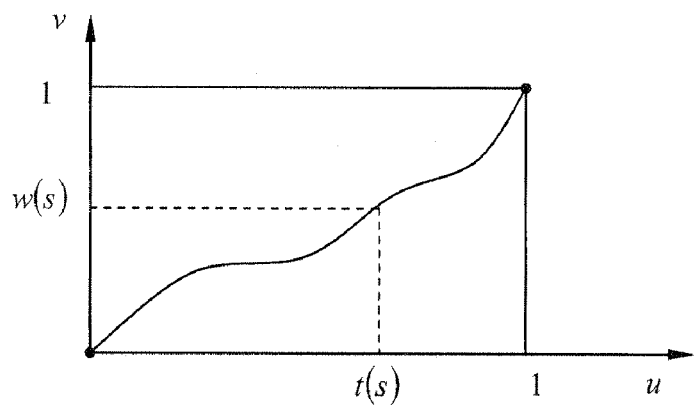
FIG. 3A
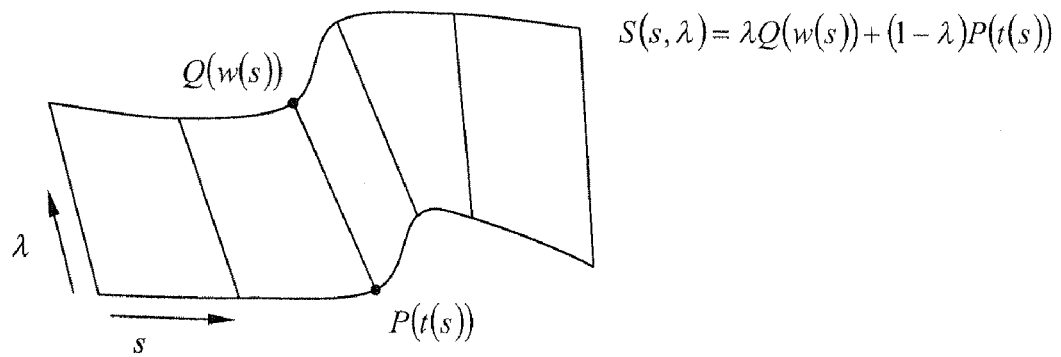
FIG. 3B
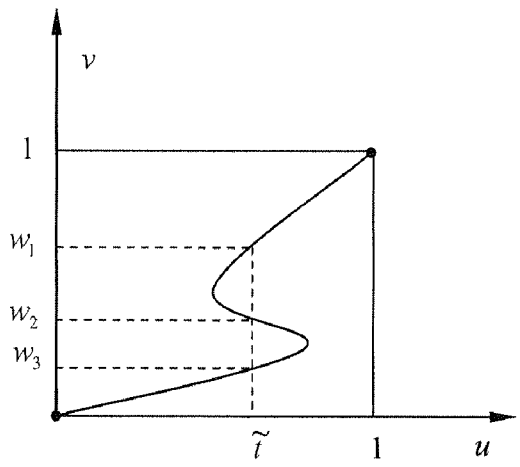 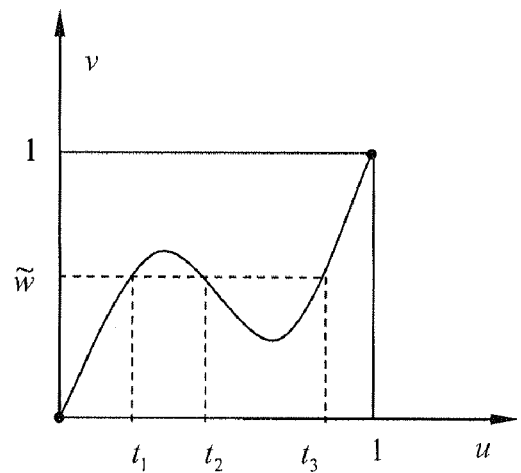
FIG. 4A  FIG. 4B

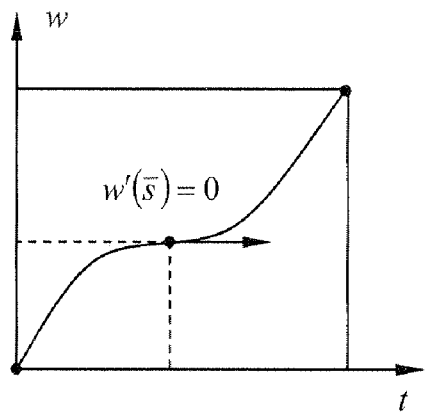
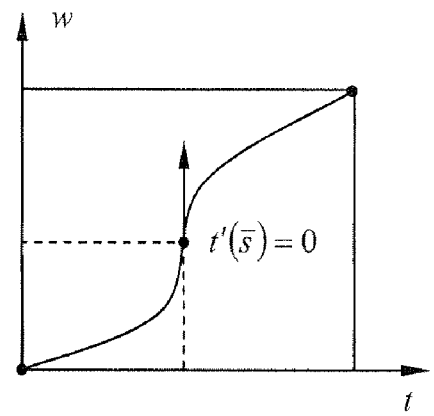
FIG. 5A                    FIG. 5B
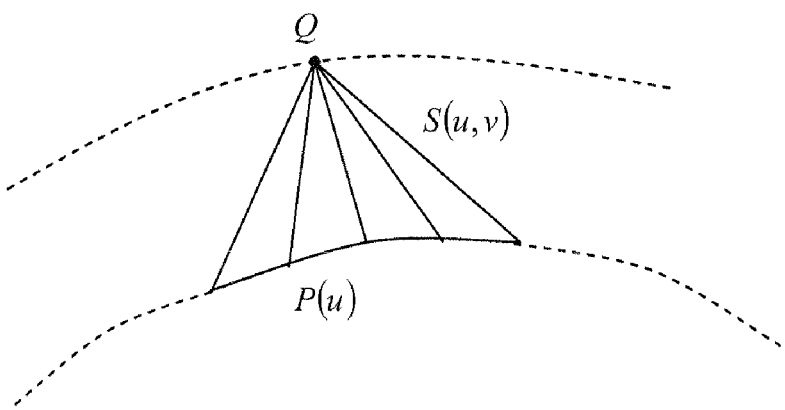
FIG. 6
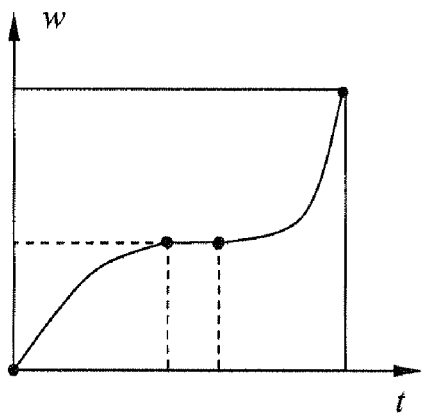
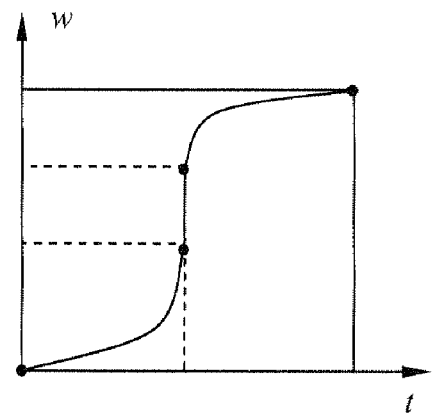
FIG. 7A                    FIG. 7B

COMPUTER-IMPLEMENTED METHOD OF DESIGN OF SURFACES DEFINED BY GUIDING CURVES

RELATED APPLICATION

This application claims priority under 35 U.S.C. §119 or 365 to European Application No. 08290659.5, filed Jul. 4, 2008.

The entire teachings of the above application(s) are incorporated herein by reference.

BACKGROUND OF THE INVENTION

The invention relates to the field of computers programs and systems, and more specifically to the field of computer-aided design (CAD), manufacturing (CAM), and engineering (CAE) systems.

A number of systems and programs are offered on the market for the design of parts, assemblies of parts and products thereof, such as the one provided by Dassault Systèmes under the trademark CATIA (Computer Aided Three Dimensional Interactive Application). CATIA is a multi-platform CAD/CAM/CAE software suite, commonly referred to as a 3D Product Lifecycle Management software suite. It supports multiple stages of product development (CAx), ranging from conceptualization, through design (CAD) and manufacturing (CAM), until analysis (CAE). This software suite is customizable via application programming interfaces (API). Some versions can be adapted in various programming languages, under dedicated APIs.

These so-called CAD systems notably allow a user to construct and manipulate complex three dimensional (3D) models of objects or assemblies of objects. CAD systems thus provide a representation of modeled objects using edges or lines, in certain cases with faces. These CAD systems manage parts or assemblies of parts as modeled objects, which are mainly specifications of geometry. In particular, CAD files contain specifications, from which geometry is generated. From geometry, a representation is generated. Specifications, geometry and representation may be stored in a single CAD file or multiple ones. CAD systems include graphic tools for representing the modeled objects to the designers; these tools are dedicated to the display of complex objects—the typical size of a file representing an object in a CAD system extending up to the range of a Mega-byte for part, and an assembly may comprise thousands of parts. A CAD system manages models of objects, which are stored in electronic files.

Designing a mechanical part with a known CAD system can be seen as defining the geometrical shape and dimensions of said part so as to fit functional and manufacturing requirements. Mainly, the resulting shape is a combination of basic features such as pad, pocket, groove, shaft etc. created by the designer. Through complex geometrical and topological computations, the CAD system yields the boundary representation of the solid (mechanical part) as e.g. a closed and oriented surface.

Other basic elements may form the shape of a part or a product, amongst which are the ruled surfaces. Ruled surface design may be part of a computer aided geometric design system. Rigorously, in geometry, a surface S is ruled if through every point of S there is a straight line that lies on S. Celebrated examples are the plane and the curved surface of a cylinder or cone. A ruled surface can accordingly be visualized as the surface formed by moving a line segment, i.e. a "straight" line in space. For example, a cone is formed by keeping one end-point of a line fixed whilst moving the other end-point in a circle. The line segment motion is for instance governed by two guiding curves, e.g. defined by the user, so that the end points of the line segment move along each guiding curve.

Ruled surfaces are often used in tooling design (e.g. casting, flash zone of forging dies, cutting tool for forged part) as well as shape design (e.g. chamfer in mechanical part design, tilted surface in architecture).

Developable surfaces, which can be unfolded into a plane without deformation, are known as a special case of ruled surfaces, incorporating an extra constraint of developability in addition to the above characteristics of a ruled surface.

Developable surfaces are used in the design of objects which must be manufactured from flat sheets of a (quasi) inextensible material, such that the material is only folded to fit the shape. Many man made objects, such as luxury handbags made of leather, certain buildings, and individual plates for ship hulls, are designed in this manner.

Several computational methods and algorithms related to ruled surface design are known in the art. A main problem is to conveniently couple the two guiding curves. There is an infinity of ways to connect the two input guiding curves by moving a line segment. The coupling strategy is thus a key feature of ruled surface design. Two coupling technologies are used.

The first one is the "implicit coupling", wherein, broadly, the CAD system is in charge of the coupling strategy. The CAD system runs an algorithm embedding a "cost function" so that the ruled surface is computed as the solution of an optimization problem, and in particular a cost-minimization problem. The cost function may capture physical properties like minimal surface area, maximal developability, minimal bending energy, minimal mean curvature variation or minimal normal variation. Furthermore, the cost function may linearly combine several of such criteria. In addition, a dedicated "coupling function", or equivalently a corresponding "coupling curve", captures how each point of the first guiding curve is connected to a point of the other guiding curve.

The coupling function is involved in the cost function together with the geometrical definition of the guiding curves. A basic property of the coupling function is to be monotonous. Otherwise, the resulting surface is singular (folded or pinched), which makes the surface unusable in any further geometrical processing. A typical reference about implicit coupling is "Optimal boundary triangulations of an interpolating ruled surface", C. C. L Wang, K. Tang, Journal of Computing and Information Science in Engineering, Vol. 5, 2005.

In addition, a "local repair" may occur. The corresponding technology is the following. A user lets the CAD system compute a ruled surface through its own implicit coupling strategy. Generally, the resulting surface is not satisfactory. Then, thanks to an interactive toolkit, the user removes by hand the "bad" portions of surface and fills the gap with a fill surface. Notice that the fill surface is defined by boundary and tangency conditions, it is not a ruled surface.

A second technology known is the "explicit coupling". Here, the CAD system user is in charge of the coupling strategy. The CAD system asks the user to select points on a guiding curve and to select the corresponding points on the other guiding curve. The number of connected points is the user's choice. This results in a finite set of coupled points, connected by line segments. Then the CAD system fills the empty space between consecutive coupling segments using a known interpolation strategy.

The known methods of implicit coupling may further make use of a numerical optimization algorithm. The scientific literature provides a large number of such algorithms.

The above methods are not infallible.

For example, implicit coupling methods involve a cost function driven or inspired by physical properties or the like. Illustrated in FIGS. 1A-C (as from the paper of Wang and Tang cited above), two ruled surfaces obtained from the same guiding curves (FIG. 1A) through different physical criteria (FIGS. 1B-1C). Notice the bad quality of surface due to local concentration of line segments. Thus, the quality of resulting surfaces must be improved.

Explicit coupling is the responsibility of the mechanical CAD user. The first drawback of this technology is that a human operator cannot deal with hundreds of coupling segments connecting two guiding curves. A few dozens is a reasonable limit, which restricts the designing scope. Next drawback is that the coupling has to be redefined or updated each time a guiding curve is modified. Even if the CAD system is history-based (meaning that points initially defined on a curve are automatically redefined on the modified curve), there is no guarantee that the updated coupling plugged on the updated guiding curves provides a correct ruled surface. Consequently, the user has to check the modified surface and, in many cases, has to rework the coupling. The last drawback of explicit coupling is that it never works at first shot. It is improved by the user through a tedious try and error iterative process. Furthermore, this try and error process is potentially required each time a guiding curve is modified.

Finally, the methods involving local repair are essentially a manual procedure. It relies on the ability of the user to see where the ruled surface is not correct. A very small singularity can be missed. Obviously, the local repair of an initial ruled surface is not suited to the modified ruled surface. Once more, local repair process has to be redone each time a guiding curve is modified.

In a few words, existing technology provides solutions that result in a bad quality output or a time consuming design process.

In addition, the underlying algorithms of implicit coupling often fail, especially in the case of involved guiding curves. Their robustness is therefore questionable.

SUMMARY OF THE INVENTION

Accordingly, the present invention aims at improving the robustness of computer-implemented methods of design of ruled surfaces. Preferably, the solution should improve the quality of surfaces output and, if possible, generalize to any surface defined by coupling two guiding curves.

To achieve this, the present invention proposes a computer-implemented method of design of a surface defined by guiding curves P(u) and Q(v) and a coupling curve s ↦ (t(s),w(s)), for improving the manufacture of products modeled by such a surface, the method comprising:
  accessing data defining guiding curves P(u) and Q(v) and a cost function ƒ(t,w);
  defining an objective function of the type J=J(ƒ,t,w), involving both the cost function ƒ(t,w) and coordinates t,w of the coupling curve s ↦ (t(s), w(s));
  optimizing said objective function J to obtain a coupling curve s ↦ (t(s),w(s)) of parameter s; and
  providing a surface according to the guiding curves P(t(s)) and Q(w(s)), respectively composed with the coordinates t,w of the coupling curve obtained, wherein, at the steps of defining and optimizing the objective function, the objective function J=J(ƒ,t,w) is constrained such that arguments t,w of the cost function ƒ(t,w) are regulated by a regulation function μ.

In given embodiments, the process according to the invention may comprise one or more of the following features:
  the method of the invention is a computer-implemented method of design of a ruled surface defined by the guiding curves P(u) and Q(v) and the coupling curve s ↦ (t(s),w(s)), wherein, at the step of providing the surface, the surface provided is a ruled surface of the type S(s,λ)=λQ(w(s))+(1−λ)P(t(s));
  at the step of defining the objective function, the objective function is defined such that it is independent from the parameterization of the cost function;
  at the step of defining the objective function, the objective function to be subsequently optimized is of the type $$J(t,w) = \int_0^1 f(t(s), w(s))\mu(t(s), w(s))ds,$$

such that the cost function is regulated by the regulation function μ;
  at the step of defining the objective function, the objective function defined is of the type $$J(t,w) = \int_0^1 f(t(s), w(s))\mu(t'(s), w'(s))ds,$$

wherein the coupling curve μ(t',w') involves first derivatives of arguments of the cost function;
  at the step of defining the objective function, the regulation function μ is a scalar, positively homogeneous function;
  at the step of optimizing the objective function, the objective function is constrained such that the derivatives involved in the regulation function are both positive, whereby an increasing coupling curve is implemented;
  at the step of optimizing the objective function, the optimization is constrained such that:

$$\frac{t'(s)}{\mu(t'(s), w'(s))} \geq \varepsilon \text{ and } \frac{w'(s)}{\mu(t'(s), w'(s))} \geq \varepsilon,$$

wherein ε is a positive threshold;
  at the step of defining the objective function, the regulation function μ is implemented so as to define a two-dimensional metric;
  at the step of optimizing the objective function, the optimization is posed as the following minimization problem:
  minJ(t,w);
  t'/μ(t',w')≧ε; and
  w'/μ(t',w')≧ε;
  at the step of defining the objective function, the regulation function is implemented as a non Euclidian metric function, for example as a function of the type μ(u,v)=|u|+|v|;
  the step of optimizing the objective function makes use of a particle swarm optimization (PSO) algorithm;
  the search space of the PSO algorithm used at the step of optimizing the objective function is restricted to a set of strictly increasing coupling curves;
  the PSO algorithm used at the step of optimizing the objective function is implemented to capture a curve corresponding to a coupling curve, as a hierarchy of $n=2^m$ variables $x_i \in [0,1]$, wherein the variables $x_i$ are hierarchical coordinates $x_i$ representing the coupling curve to be captured; and at the step of optimizing the objective function, the hierarchical coordinates $x_i$ are transformed into Cartesian coordinates $(t_i, w_i)$.

The invention further concerns a computerized system or a computer program product comprising means or program code means adapted for implementing the method of the invention.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

Various embodiments of the invention are now discussed, in reference to the drawings, in which:

FIGS. 1A-C illustrate drawbacks of prior art methods based on implicit coupling;

FIG. 2 is a flowchart of the overall process, according to a preferred embodiment;

FIG. 3A shows a coupling curve associating parameter values t(s) and w(s);

FIG. 3B exemplifies a resulting ruled surface;

FIGS. 4A-B illustrate oscillating coupling curves;

FIGS. 5A-B show monotone increasing but not strictly increasing coupling curves;

FIG. 6 shows a non planar triangular ruled surface;

FIGS. 7A-B depict locally horizontal and locally vertical increasing (but not strictly increasing) coupling curves;

DETAILED DESCRIPTION OF THE INVENTION

Figure 8A:
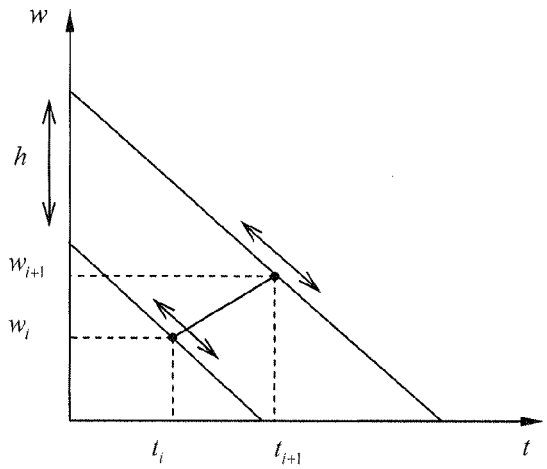
FIGS. 8A-B show discretized arguments $(t_i, w_i)$ of the cost function f(t,w) for the evaluation of the regulation function $\mu(\Delta t_i, \Delta w_i)$, wherein points $(t_i, w_i)$ are constrained on parallel lines, and perpendicular to the diagonal (for two consecutive points $(t_i, w_i)$ and $(t_{i+1}, w_{i+1})$ in FIG. 8A and for a series of points in FIG. 8B).

A description of example embodiments of the invention follows.

The present description is structured as follows. First, the present invention and preferred embodiments thereof are described broadly. Then, the overall process is described, step by step. Finally, details of the preferred embodiments are investigated.

In a few words, the present invention relates to a method of design of (ruled) surfaces, based on a scheme of implicit coupling. According to the invention, the objective function $J=J(f,t,w)$ is constrained such that arguments t,w of the cost function $f(t,w)$ are regulated by a regulation function $\mu$. Thus, a regulation function $\mu$ is here involved, in addition to the cost function. The regulation function acts on the arguments t,w of the cost function $f(t,w)$. More exactly, the function $\mu$ regulates the said arguments during the optimization, just as an anti-lock brake controller regulates the rotational speed of the wheels of a car. Similarly, the function $\mu$ regulates the said arguments in that it typically acts on the "speed" (i.e. the first derivative) thereof. Hence, the objective function is further constrained, according to a non-geometrical criterion.

The robustness of the underlying algorithm is thereby improved, as shall be illustrated in various examples below. All the more, results obtained are more meaningful to the user and the quality of surfaces returned by the design system is improved. In contrast, a usual implicit-coupling algorithm is likely to get poorly meaningful results, governed by the geometry only. Interestingly, the present method can be generalized to any surface defined by coupling two guiding curves. In fact, the present inventors have realized that drawbacks of existing methods of implicit coupling arise due to a weakness of the optimization algorithm. In particular, they have realized that the level of constraints of the objective function to optimize is not sufficient to ensure a robust optimization and meaningful results. Moreover, they have understood that the physical-like criteria involved in the cost function do not suffice to secure the optimization algorithm. While taking some criteria is unavoidable to cope with the infinity of coupling solutions, the present inventors have then realized that the required criteria should extend beyond the usual physical criteria. This contrasts with a number of prior art approaches wherein physical criteria have systematically been developed to improve the final surfaces or the robustness of the implicit coupling algorithm.

Relying instead on a regulation function to further constrain the optimization process turns out all the more convenient since physical properties are not particularly significant to the mechanical designer (besides the developability, as discussed below). Indeed, the expectation of the designer is ease of use, performance and robustness. None of these criteria is captured by a physical-like property, whereas the regulation function at stake secures the underlying optimization algorithm.

As said, perhaps the sole physical property that really deals with the ruled property is the "developability". However, given two arbitrary guiding curves, there exists generally no developable surface to connect them. And even if, locally, a developable surface exists, it is not always regular everywhere. Accordingly, a physical-like cost-function can be concluded not to satisfy the mechanical CAD user expectation.

This being said, the preferred embodiments are now broadly described.

First, the cost-function can be augmented by the above regulation function, hence yielding an effective cost-function that can be adjusted to fit one or more of the following goals: user's expectation, numerical evaluation performance, parallelizable algorithm, robustness. As opposed to background art, the resulting effective cost-function is not driven by physical properties only, possibly no physical property at all.

It is for example designed to provide a smooth surface in the following sense. On one hand, the line segments of the resulting surface are harmoniously arranged all along the way. This can be captured through the effective cost-function itself (or the regulation function). Now, a principle of the invention is to take advantage of the flexibility provided by the above specification of "harmoniously arranged" line segments. Within this range of freedom, the effective cost-function can be designed as well to perform efficiently during the numerical solving step. This allows a robust solving algorithm, well suited to the arbitrary complexity of guiding curves.

On the other hand, the tangent plane can be everywhere defined by evaluating first order partial derivatives. This can further be captured by imposing a strictly increasing coupling curve.

In addition and as shall be described in details, the effective cost-function can be adapted to parallel processing. For example, the "Particle Swarm Optimization" (PSO) algorithm turns out to be particularly well suited to the problem as posed. It is able to overcome a local solution trap and converge toward a far and better solution. The PSO algorithm is also trivial to parallelize, because it executes a large number of simultaneous and independent evaluations of the cost function. The reader may for example refer to: "Swarm Intelligence, Focus on Ant and Particle Swarm Optimization", edited by Felix T.S. Chan and Manoj Kumar Tiwari, Publisher: I-Tech Education and Publishing, Vienna, Austria, December 2007.

Before turning to details of the preferred embodiments, the overall process is briefly described in reference to FIG. 2.

The method of the invention comprises a step S110, S120 of accessing data defining guiding curves P(u) and Q(v) (step S110) and a cost function $f(t,w)$ (step S120). Given the user selected guiding curves P(u) and Q(v), the unknown coupling is a parameterized curve $s \mapsto (t(s),w(s))$, which could else be defined as a function instead of a curve. A cost function $f(t,w)$ defines, as known, a relevant characteristic modeling the quality of the ruled surface. This characteristic is closely related to the guiding curves geometry.

The method further comprises defining (step S200) an objective function of the type J=J($f$,t,w), as known, involving both the cost function $f(t,w)$ and coordinates t, w of the coupling curve $s \mapsto (t(s),w(s))$.

Then, optimizing at step S310 the objective function J according to the optimization problem posed (see e.g. the problem as posed at S300) makes it possible to obtain the target coupling curve $s \mapsto (t(s),w(s))$, step S400. As said, different optimization algorithms can be contemplated. The choice of the PSO algorithm will be described in details later.

Finally, a ruled surface $S(s,\lambda)=\lambda Q(w(s))+(1-\lambda)P(t(s))$ is provided, step S500, according to the guiding curves P(t(s)) and Q(w(s)). Note that the guiding curves P(u) and Q(v) are actually composed with the coordinates t,w of the coupling curve previously obtained.

What has been just described is merely an implicit coupling scheme. Now, as noted above and according to the invention, the objective function J=J($f$,t,w) is further constrained (S200-S400) such that arguments t,w of the cost function $f(t,w)$ are regulated by a regulation function μ. Obviously, since two arguments are involved, each of the arguments are likely to be regulated independently by the regulation function. Said regulation function μ is for instance accessed through relevant data at step S130, e.g. together or parallel with steps S110, S120.

In contrast with the cost function $f(t,w)$, as long as μ is devoted to the regulation of arguments involved in the cost function, μ is independent of the guiding curves. A simple and practical way of achieving this is to make the regulation function μ depend on derivatives of arguments t,w. Hence, μ(t',w') is independent of the guiding curves. Similarly, and as noted earlier, an anti-lock brake controller measures and regulates rotational speed of car wheels; it does not directly depend on the conformation of the road. Other examples could help in understanding the present invention. For instance, we may somehow compare the present context with that of a skater, willing to skate a double-rail structure with each of his/her skates engaged in respective guiding rails of the structure (each being comparable here to a guiding curve). One can easily grasp the potential difficulty of the exercise, especially in the case of involved guiding rails. However, the skater may realize that the difficulty could be partly overcome by regulating (i.e. adapting by increasing or decreasing temporarily) the speed of each of his/her skates. Likewise, the arguments of the cost function are likely to be regulated by the regulation function.

Yet, different ways of regulating arguments t,w can be contemplated, e.g. by locally confining arguments t,w in a given interval. Making μ depend on derivatives is however more meaningful to the user and, incidentally, quite efficient on the computational side. Note that higher-order derivatives could be involved in specific applications.

Next, implementation of μ(t',w') is preferably such the objective function is independent from the parameterization of the cost function. This notably ensures invariance property of the objective function and contributes to improve the robustness of the underlying algorithm.

In this regard, various possibilities for constraining the objective function J=J($f$,t,w) can be contemplated. Yet, instead of implementing the constraint as an external constraint, it is advantageous to implement the constraint implicitly, that is, internally to the objective function J. Accordingly, the underlying algorithm (and corresponding computational cost) is not substantially impacted with respect to the prior art implicit coupling. A convenient example is an objective function J of the type:

$$J(t,w) = \int_0^1 f(t(s), w(s))\mu(t'(s), w'(s))ds.$$

Now, since the regulation function μ depend preferably on derivatives of arguments t,w, a suitable choice is to implement the objective function as $J=\int f(t,w)\mu(t',w')ds$, which actually amounts to consider an effective cost function $f(t,w)\mu(t',w')$, involving both the usual cost function and function μ. The optimization problem is posed at step S300.

In particular, the derivatives involved in the regulation function are preferably both positive, whereby an increasing coupling curve is implemented. This shall be further discussed later.

The next step (S310) is to optimize (e.g. minimize) the objective function previously defined, according to the problem posed. A suited optimization algorithm may provide an optimal coupling curve, which in turns defines the output ruled surface.

Having in mind the overall process, we now turn to details of the preferred embodiments.

A first point relates to the coupling curve. In particular, the following paragraphs aims at proving that if the coupling curve is not strictly increasing, a singularity always occurs.

In this respect, the input guiding curves are P(u),u∈[0,1] and Q(v),v∈[0,1], as known in the art. They are typically smooth, which means that P'(u)≠0 and Q'(v)≠0 for all u∈[0,1] and all v∈[0,1]. The unknown coupling curve $s \mapsto (t(s),w(s))$, s∈[0,1] is a planar curve in the [0,1]×[0,1] space such that t(0)=0,t(1)=1,w(0)=0 and w(1)=1.

As illustrated in FIG. 3A, for each value of parameter s ∈[0,1], the coupling curve associates parameter values t(s) and w(s), which defines the line segment joining points P(t(s)) and Q(w(s)). In other words, the unknown ruled surface to be obtained (FIG. 3B) is parameterized by $S:[0,1] \times [0,1] \to R^3$,
$S(s,\lambda) = \lambda Q(w(s)) + (1-\lambda) P(t(s))$.

FIG. 3B depicts such a ruled surface, wherein points $P(t(s))$ and $Q(w(s))$ are joined by a line segment.

It is important to understand how the variations of the coupling curve govern the regularity of the ruled surface.

As a first example, if the coupling curve oscillates, then a folded surface results. In fact, here the ruled surface is not injective, meaning that there exists $(s_1,\lambda_1)$ and $(s_2,\lambda_2)$ such that $(s_1,\lambda_1) \neq (s_2,\lambda_1)$ and $S(s_1,\lambda_1) = S(s_2,\lambda_2)$. Indeed, since the coupling curve oscillates, there exists $s_1, s_2$ and $s_3$ such that $t(s_1) = t(s_2) = t(s_3) = \bar{t}$ and distinct $w(s_i) = w_i$ as illustrated in FIG. 4A. Then, $S(s_i,\lambda) = \lambda Q(w_i) + (1-\lambda) P(\bar{t})$ so $S(s_i,0) = P(\bar{t})$ for $i=1, 2, 3$, as expected. The same proof holds $w(s_1) = w(s_2) = w(s_3) = \tilde{w}$ and $(s_i) = t_i$ as illustrated in FIG. 4B.

The variations of the coupling curve may have other effects on the regularity of the ruled surface. As a second example, if the coupling curve is monotone increasing but not strictly increasing, a pinched surface results. A monotonous increasing coupling curve (but not strictly increasing) means that there is an isolated parameter value $\bar{s} \in [0,1]$ such that $w'(\bar{s}) = 0$, as illustrated in FIG. 5A. Then, the vector product of the first order partial derivatives vanishes when $(s, \lambda) = (\bar{s}, 1)$, that is, $S_s(\bar{s}, 1) \hat{} S_\lambda(\bar{s}, 1) = 0$. Yet, the limit normal vector $$\frac{S_s(\bar{s}, \lambda) \wedge S_\lambda(\bar{s}, \lambda)}{\|S_s(\bar{s}, \lambda) \wedge S_\lambda(\bar{s}, \lambda)\|}$$

can be shown to be well defined when $\lambda \to 1$.

Accordingly, one understands why the coupling curve implemented is preferably a strictly increasing function.

Similarly, it may be realized that if the coupling curve is monotone increasing but not strictly increasing, an isolated parameter value $\bar{s} \in [0,1]$ exists such that $t'(\bar{s}) = 0$, see FIG. 5B, then the vector product of the first order partial derivatives vanishes when $(s,\lambda) = (\bar{s}, 0)$, that is, $S_s(\bar{s},0) \hat{} S_\lambda(\bar{s},0) = 0$. Nevertheless, the limit normal vector $$\frac{S_s(\bar{s}, \lambda) \wedge S_\lambda(\bar{s}, \lambda)}{\|S_s(\bar{s}, \lambda) \wedge S_\lambda(\bar{s}, \lambda)\|}$$

can be shown to be well defined when $\lambda \to 0$.

A third example concerns non planar triangular ruled surfaces, as exemplified in FIG. 6. Let $P(u), u \in [0,1]$ be a parameterized 3D curve and $Q$ a point not on curve $P$. The triangular surface is defined by $S(u, v) = vQ + (1-v) P(u)$. Then, the tangent plane to surface $S$ at point $Q$ is not defined through first order partial derivatives, that is $S_u(u,1) \hat{} S_v(u,1) = 0$ for all $u \in [0,1]$. Furthermore, it can be shown that this tangent plane does not exist, unless curve $P$ is fully included in a plane including point $Q$. This results in a singularity.

Such a singularity occurs when the coupling curve is locally horizontal or locally vertical, as illustrated in FIG. 7A or 7B, respectively (note that the situation slightly differs compared with that of FIGS. 5A or 5B). If the coupling curve is locally horizontal or locally vertical, then moving along the guiding curves, one end of the line segment "stops" during a short period of time while the other end goes on moving.

One can understand from the three investigations above that the coupling curve has preferably to be strictly increasing, should it be to improve the quality of the ruled surface output. In particular, it may be strictly increasing in the following sense: $t'>0$ and $w'>0$. Else, a singularity occurs, making the surface more difficult to use in a further geometrical process. In this respect, it may be noticed that a cone surface is developable but it features the "non planar triangular ruled surface" singularity, which may cause rounding and filleting failure.

To conclude on these brief investigations, the objective function is preferably constrained such that the derivatives involved in the regulation function are both positive, whereby a (strictly) increasing coupling curve is implemented. As a result, this notably prevents obtaining folded, pinched or non planar triangular surfaces.

Next, additional details are discussed as to the regulation function $\mu(u,v)$. Some of the following aspects are better understood in relation with the flowchart of FIG. 2.

We have seen that as long as $\mu$ remains devoted to the regulation of arguments involved in the cost function, $\mu$ is independent of the guiding curves. In addition, this function is important inasmuch as it may be implemented so as to yield an invariance property (with respect to reparameterization of the cost function), which shall be detailed later. In particular, opting for a choice of variables which naturally imposes the invariance helps the practical implementation (it does not depend on the guiding curves). Accordingly, choosing a suitable $\mu(u,v)$ simplifies the numerical problem and accelerates the solving.

Function $\mu(u,v)$ is for instance chosen as a scalar function that is positively homogeneous. This property advantageously results in that the objective function, when defined as $$J(t, w) = \int_0^1 f(t(s), w(s)) \mu(t'(s), w'(s)) ds,$$

is independent from the parameterization of the coupling curve, whereby the problem is well posed. Else, the algorithm may get lost.

In addition, function $\mu(u, v)$ is preferably chosen such that $$d\left(\begin{pmatrix} x_1 \\ y_1 \end{pmatrix}, \begin{pmatrix} x_2 \\ y_2 \end{pmatrix}\right) = \mu(x_1 - x_2, y_1 - y_2)$$

defines a two-dimensional metric. This notably means that, for all real numbers $u,v,\lambda$, the metric axioms are satisfied, namely $\mu(u,v) \geq 0$
$\mu(u,v) = \mu(v,u)$
$\mu(u,w) \leq \mu(u,v) + \mu(v,w)$
$\mu(u,v) = 0 \Rightarrow u = v = 0$ together with:

$\mu(\lambda u, \lambda v) = |\lambda| \mu(u,v)$. As we shall see, this will prove advantageous to normalize the definition of the strictly increasing coupling curve.

Next, not much has been said until now about the cost function. The cost function, or $f = f(t,w)$, is likely to capture the significant geometrical quantity. According to experiments carried out during the development of the present invention, a very convenient function $f$ for a ruled surface is, in practice, defined as $f(t,w) = \|P(t) - Q(w)\|$. Notice that the input guiding curves play a symmetrical role so that the resulting ruled surface does not depend on a user selection order, if any. Indeed, reversing curves $P$ and $Q$ and reversing the coordinates of the coupling curve yields $\|Q(w) - P(t)\|$, that is, the same value as $\|P(t) - Q(w)\|$. This makes the ruled surface creation easier from the user point of view. In this respect, referring back shortly to the flowchart of FIG. 2, it is to be understood that the (user) selection, if any, of the input guiding curves occurs prior to steps S110 and S120.

Next, in an embodiment, the cost function may furthermore capture a "developable" criterion (e.g. related to a developable surface), if necessary. In this respect, one has to keep in mind that this criterion is involved in the cost function only, when explicitly required by the designer, and that it must be combined with another smoothing criterion because the developable surface does generally not exist.

Having defined both the cost and regulation functions, we turn to the objective function J.

As discussed earlier, the objective function is defined as an integral of the product of functions $f$ and $\mu$. By "integral", it is meant a number close to an area bound by said product, it being understood that a discretization of said integral is obviously contemplated.

As mentioned too, function $f=f(t,w)$ captures the geometry, as known in the art. Function $\mu(u,v)$ preferably involves the derivatives of the coupling curve $\mu(t', w')$ in order to provide the invariance property (as detailed later). Thus, the objective function is defined as:

$$J(t, w) = \int_0^1 f(t(s), w(s))\mu(t'(s), w'(s))ds.$$

As it can be realized from such a definition, the shape of the resulting ruled surface depends on the shape of the coupling curve, but not on how the coupling curve is parameterized. For this reason, the objective function is invariant under re-parameterization of the coupling curve. Formally, this means that $J(t \circ \phi, w \circ \phi) = J(t, w)$ for any strictly increasing function $\phi$ mapping interval [0,1] onto itself. This goal is for instance achieved thanks to a positively homogeneous function $\mu$. Yet, it can be shown that re-parameterization invariance is captured without any more assumption about function $\mu$.

We now briefly revert to the concept of "strictly increasing" constraint. A straightforward translation of a strictly increasing coupling curve is that the derivatives are both strictly positive, that is $t'(s)>0$ and $w'(s)>0$ for all $s \in [0,1]$. However, it may be realized that a strict inequality does not define a correct constraint in an optimization problem. Rather, a relevant constraint is "greater that or equal to". Accordingly, some threshold $\epsilon>0$ is advantageous to handle how close to the horizontal (or vertical) direction the coupling curve can be.

In addition, a normalization can be introduced, consistently with the fact that a direction is concerned. In this respect, a particularly advantageous choice is to reuse the previously introduced function $\mu$, namely $$\frac{t'(s)}{\mu(t'(s), w'(s))} \geq \varepsilon \text{ and } \frac{w'(s)}{\mu(t'(s), w'(s))} \geq \varepsilon.$$

Accordingly, at the step of optimizing the objective function, the optimization is preferably constrained according to the above constraints, wherein $\epsilon$ is a positive threshold.

Moreover, the regulation function is preferably implemented as a non Euclidian metric function, for example as $\mu(u,v) = |u| + |v|$, and this, for reasons that shall appear later. From the mathematical and computational points of view, the non Euclidian distance is substituted to the traditional Euclidian $\sqrt{t'(s)^2 + w'(s)^2}$, with no impact on the nature of the problem because the metrics are equivalent. Obviously, this impacts the shape of the resulting ruled surface. Yet, this change is not relevant to the user because the quality of the resulting ruled surface is equivalent.

For the sake of completeness, it should be noted that, from the theoretical point of view, the required coupling could be defined through a function $s \mapsto (s, k(s))$ rather than with a parameterized curve $s \mapsto (t(s), w(s))$. Yet, it is to be understood that this is equivalent for the implementation of the present invention. Indeed, using the constraint $t'(s)>0$ and thanks to the variable change $u=t(s), s=t^{-1}(u)$, and $$ds = \frac{1}{t'(t^{-1}(u))} du$$

in $$\int_0^1 f(t(s), w(s))\mu(t'(s), w'(s))ds,$$

one obtains, using an homogeneous function $\mu$, $$\int_0^1 f\binom{t(s),}{w(s)}\mu\binom{t'(s),}{w'(s)}ds = \int_{t(0)}^{t(1)} f\binom{u, w}{(t^{-1}(u))}\mu\binom{t'(t^{-1}(u)),}{w'(t^{-1}(u))}\frac{1}{t'(t^{-1}(u))}du$$

$$= \int_0^1 f(u, w(t^{-1}(u)))\mu\left(1, \frac{w'(t^{-1}(u))}{t'(t^{-1}(u))}\right)du$$

$$= \int_0^1 f(u, k(u))\mu(1, k'(u))du,$$

where $k = w \circ t^{-1}$ and due to $$k'(u) = \frac{w'(t^{-1}(u))}{t'(t^{-1}(u))}.$$

The normalized constraint $$\varepsilon \leq \frac{k'(u)}{\mu(1, k'(u))} \leq \frac{1}{\varepsilon}$$

makes the coupling function strictly increasing. The objective function becomes $$J(k) = \int_0^1 f(u, k)\mu(1, k')du.$$

However, dealing with a functional coupling instead of a parameterized coupling does not change the numerical formulation of the problem. Accordingly, starting from a coupling function or a parameterized curve is equivalent. Yet, a parameterized coupling is preferred here and used in the following, inasmuch as it allows some more symmetrical formulation of the problem (t and w play identical roles). Hence, the practical implementation is made easier.

Next, the minimization problem is discussed, and in particular the problem of continuous minimization problem.

The unknown target coupling curve $s \mapsto (t(s), w(s))$ is specified to minimize the objective function and satisfy the constraints. According to a preferred embodiment, this can be formalized as follow:

$\min J(t,w)$;
$t'/\mu(t',w') \geq \epsilon$; and
$w'/\mu(t',w') \geq \epsilon$,
where $$J(t, w) = \int_0^1 f(t, w)\mu(t', w')ds.$$

The problem that raises now is that of a numerical minimization.

In this respect, given a uniform meshing of interval [0,1] by n+1 points $s_i = ih$, $i=0, \ldots, n$ (including endpoints) defined by step size $h=1/n$, the integral can be approximated, as evoked earlier, by a discrete formula, namely $$\int_0^1 f(t, w)\mu(t', w')ds \approx h\sum_i \alpha_i f(t_i, w_i)\mu(t'_i, w'_i),$$

where coefficients $\alpha_i$ arise due to the numerical integration method (e.g. the weights in a Legendre-Gauss quadrature) and do not need be detailed, $t_i$ stands for $t(s_i)$ etc. Then the derivatives $t'_i$ and $w'_i$ can respectively be approximated by $$t'_i \approx \frac{\Delta t_i}{h} \text{ and } w'_i \approx \frac{\Delta w_i}{h},$$

where $\Delta t_i = t_{i+1} - t_i$ and $\Delta w_i = w_{i+1} - w_i$.

Now, choosing an homogeneous function $\mu$ notably simplifies the formula and subsequent computation. Namely, the discretized integral becomes:

$$h\sum_i \alpha_i f(t_i, w_i)\mu(t'_i, w'_i) \approx h\sum_i \alpha_i f(t_i, w_i)\mu\left(\frac{\Delta t_i}{h}, \frac{\Delta w_i}{h}\right)$$
$$= \sum_i \alpha_i f(t_i, w_i)\mu(\Delta t_i, \Delta w_i).$$

Finally, the discretized objective function $\tilde{J}$ that results is $$\tilde{J}(t_0, \ldots t_n, w_0, \ldots w_n) = \sum_i \alpha_i f(t_i, w_i)\mu(\Delta t_i, \Delta w_i).$$

Using now $$\frac{u/h}{\mu(u/h, v/h)} = \frac{u}{h\mu(u/h, v/h)} = \frac{u}{\mu(u, v)},$$

the relevant discrete constraints are $$\frac{\Delta t_i}{\mu(\Delta t_i, \Delta w_i)} \geq \epsilon$$

$$\frac{\Delta w_i}{\mu(\Delta t_i, \Delta w_i)} \geq \epsilon$$

Next, more will be said as to the choice of function $\mu$. The traditional choice is the Euclidian function $\mu(u,v) = \sqrt{u^2 + v^2}$. However, the non Euclidian choice $\mu(u,v) = |u| + |v|$ is particularly advantageous here, as it is a homogeneous function. This choice turns all the more beneficial together with the setting $\mu(\Delta t_i, \Delta w_i) = h$ (relating to the above discrete constraints), whereby an efficient normalization of the optimization problem is achieved. The numerical problem turns out to be:

$$\text{Min}\sum_i \alpha_i f(t_i, w_i)$$

$$\frac{\Delta t_i}{h} \geq \epsilon$$

$$\frac{\Delta w_i}{h} \geq \epsilon$$

Figure 8B:
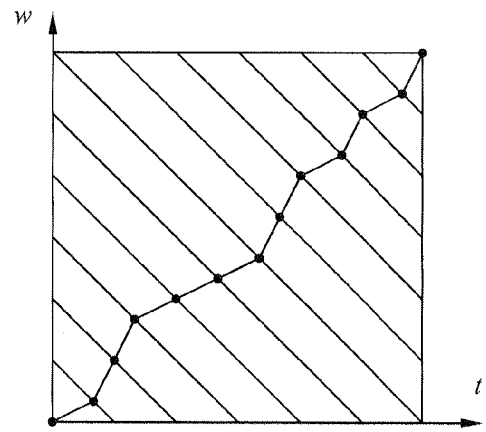

Such a setting is indeed meaningful because the n−1 points $(t_i, w_i)$ are constraint on n−1 parallel lines perpendicular to the diagonal, said lines being separated by $h/\sqrt{2}$, as illustrated in FIG. 8A (for two consecutive points $(t_i, w_i)$ and $(t_{i+1}, w_{i+1})$) and FIG. 8B (schematically for a series of points).

Accordingly, additional robustness arises due to the fact that unknown points move along equidistant parallel lines, whereby overlap or interference is prevented. This allows the algorithm to handle complex guiding curves, and even arbitrary complex curves, to the knowledge of the inventors. For example, very long curves featuring many small details such as local turns and rounds can be safely handled; in contrast with the known prior art methods.

The discussion is now directed to the implementation of an optimization algorithm. As mentioned above, the present inventors found particularly advantageous to make use of the particle swarm optimization (PSO) algorithm. As opposed to traditional optimization algorithms, the PSO algorithm performs ten to thirty optimum searches at the same time. Each searching process communicates with "neighboring processes" in order to take benefit of "good searching directions" and, nevertheless, is autonomous enough to investigate unexplored regions. The art of PSO algorithm is to define and implement these concepts, as known by the skilled person. Experiments show for instance that good results are obtained with thirty simultaneous searches. PSO algorithm communicates with the application through external calls. It needs to periodically evaluate the objective function during the search process.

When the invention is to be implemented together with strictly increasing coupling curves, a challenge in implementing the PSO algorithm is to guarantee that the search is performed within a set of strictly increasing coupling curves. Different approaches can be contemplated.

One possible implementation is to capture the coupling curve as a hierarchy of $n = 2^m$ variables $x_i \in [0,1]$ $i=1, \ldots, 2^m$. Given these variables, the corresponding coupling curve can be e.g. recursively defined as follows, and in reference to FIGS. 9A-12B.

Figure 9A:
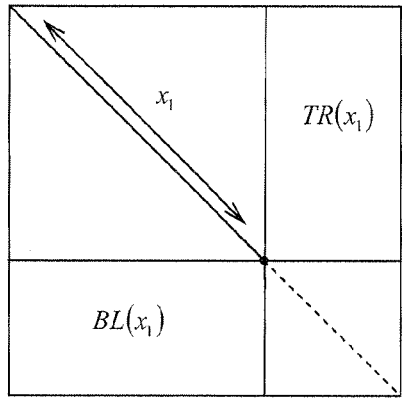
FIGS. 9A-12B graphically illustrate an implementation of the flowchart of FIG. 13.
Figure 9B:
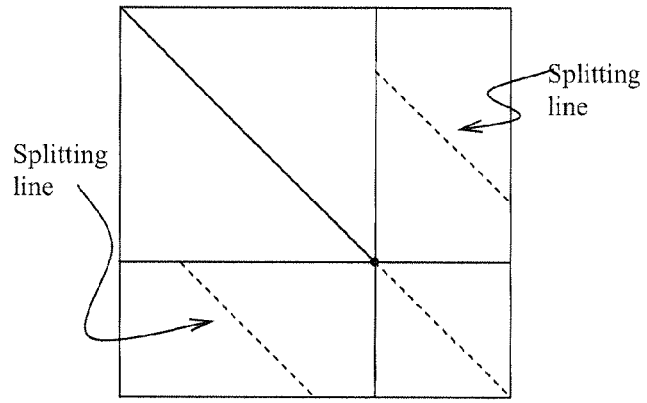

First, $x_1$ is the abscissa of the point of the coupling curve located on the second diagonal, starting from top left corner (FIG. 9A). This point defines two rectangles, bottom left $BL(x_1)$ and top right $TR(x_1)$ (FIG. 9B). In each rectangle, a splitting line segment parallel to the second diagonal separates the rectangle into two equal regions.

Figure 10A:
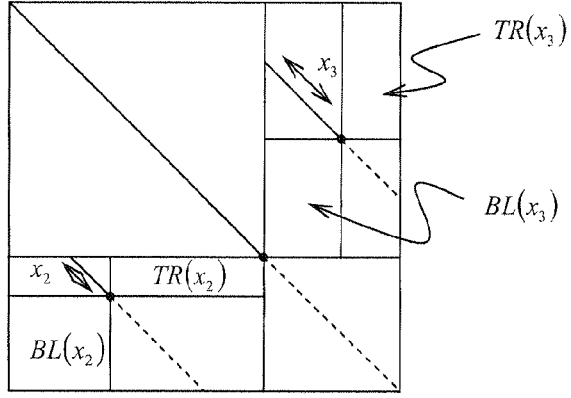
Figure 10B:
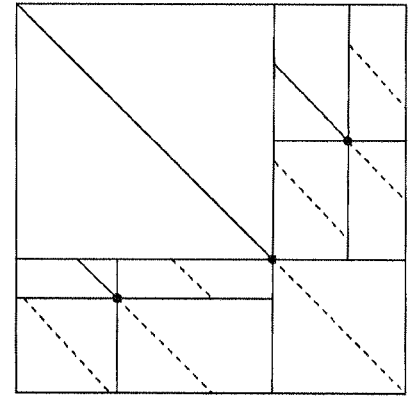

Then, $x_2$ is the abscissa of the coupling curve's point located on the splitting line of rectangle $BL(x_1)$ and $x_3$ is the abscissa of the coupling curve's point located on the splitting line of rectangle $TR(x_1)$. These new points define two bottom left rectangles, $BL(x_2)$, $BL(x_3)$, and two top right rectangles, $TR(x_2)$, $TR(x_3)$ (FIG. 10A) equipped with their respective splitting lines (FIG. 10B).

Figure 11:
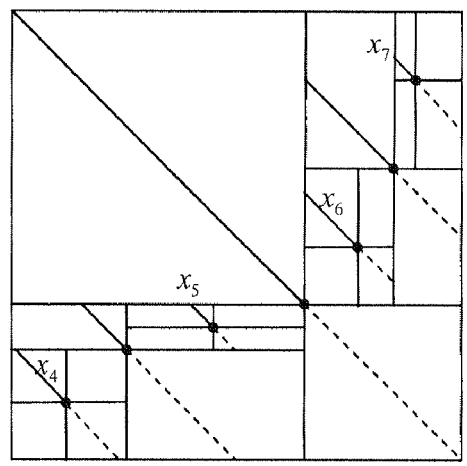

Then, $x_4$ is the abscissa of the coupling curve's point located on the splitting line of rectangle $BL(x_2)$, $x_5$ is the abscissa of the coupling curve's point located on the splitting line of rectangle $TR(x_2)$, $x_6$ is the abscissa of the coupling curve's point located on the splitting line of rectangle $BL(x_3)$ and $x_7$ is the abscissa of the coupling curve's point located on the splitting line of rectangle $TR(x_3)$ as illustrated in FIG. 11.

Figure 12A:
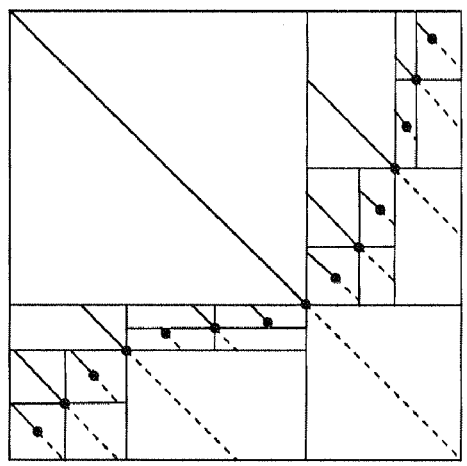
Figure 12B:
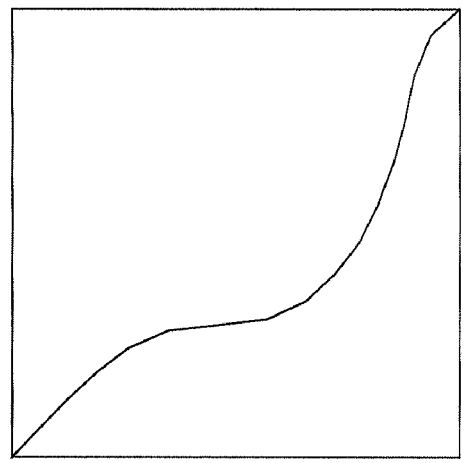

One understands that, applied recursively, this process uniquely defines a strictly increasing curve, as shown in FIG. 12A (fine scale) and FIG. 12B (converged limiting curve, in the above example).

Figure 13:
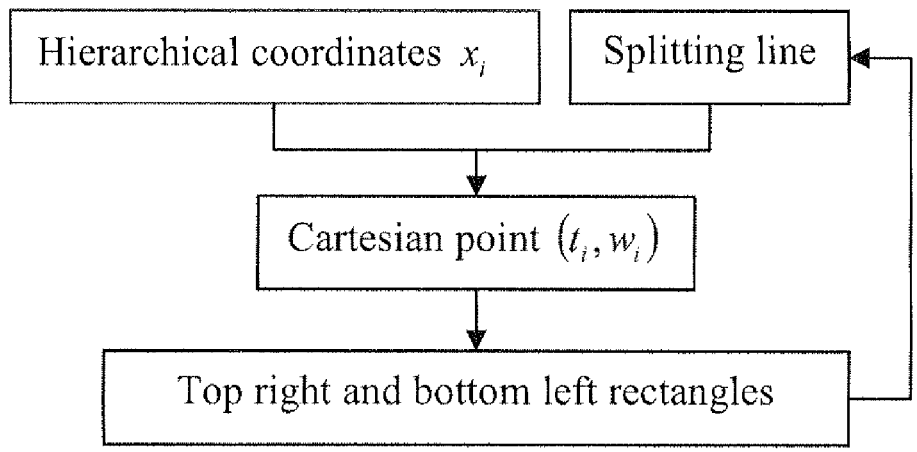
FIG. 13 is a flowchart exemplifying the computation of Cartesian points $(t_i, w_i)$ of the coupling curve from hierarchical coordinates $x_i$.

The flow chart of FIG. 13 illustrates an example of how to compute the Cartesian points $(t_i, w_i)$ of the coupling curve from hierarchical coordinates $x_i$.

Figure 14:
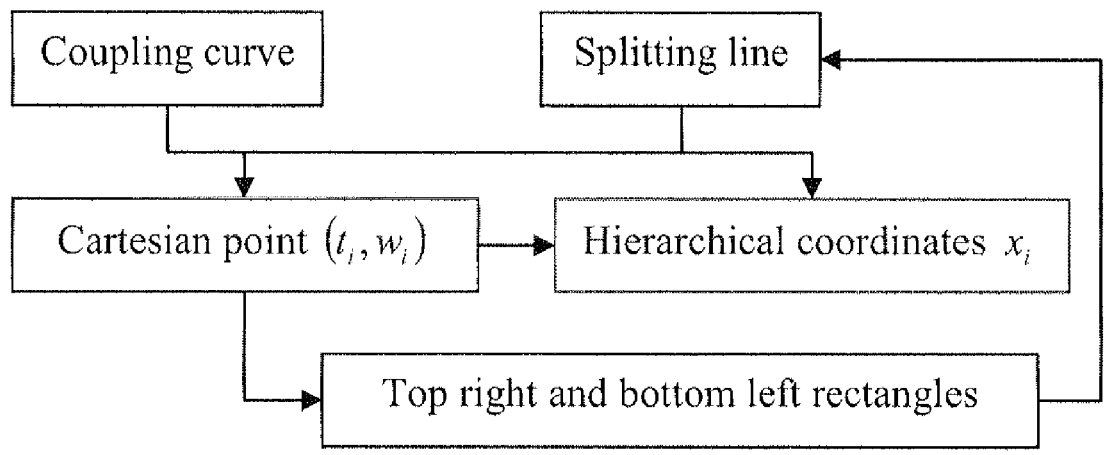
FIG. 14 is a flowchart exemplifying the reverse computation (with respect to the computation of FIG. 13).

Clearly, the reverse process computes hierarchical coordinates $x_i$ from Cartesian coordinates $(t_i, w_i)$ of a strictly increasing curve by intersecting the curve with the rectangles splitting lines, as illustrated in FIG. 14.

Consequently, the PSO algorithm deals with the hierarchical coordinates $x_i$ of coupling curves. Each time the objective function needs to be evaluated, through an external call, hierarchical coordinates $x_i$ are transformed into Cartesian coordinates $(t_i, w_i)$.

Experiments show that good results are obtained with thirty simultaneous searches and with a coupling curve sampling from 32 points to 128 points. Furthermore, when PSO algorithm gets close to the optimum, a traditional non linear optimization method (typically BFGS) can be used to accelerate the convergence. Although the method and routines described herein above are described in a naive manner, for the sake of pedagogy, it is obvious that improvements can be contemplated with respect to algorithm efficiency considerations. For instance, it is pointed at that the present method generalizes to any surface defined by coupling two guiding curves (e.g. based on guiding curves). Indeed, there are several ways of coupling guiding curves that result in surfaces which are not necessarily ruled surfaces. Accordingly, the present invention extends beyond the sole ruled surfaces.

Figure 15A:
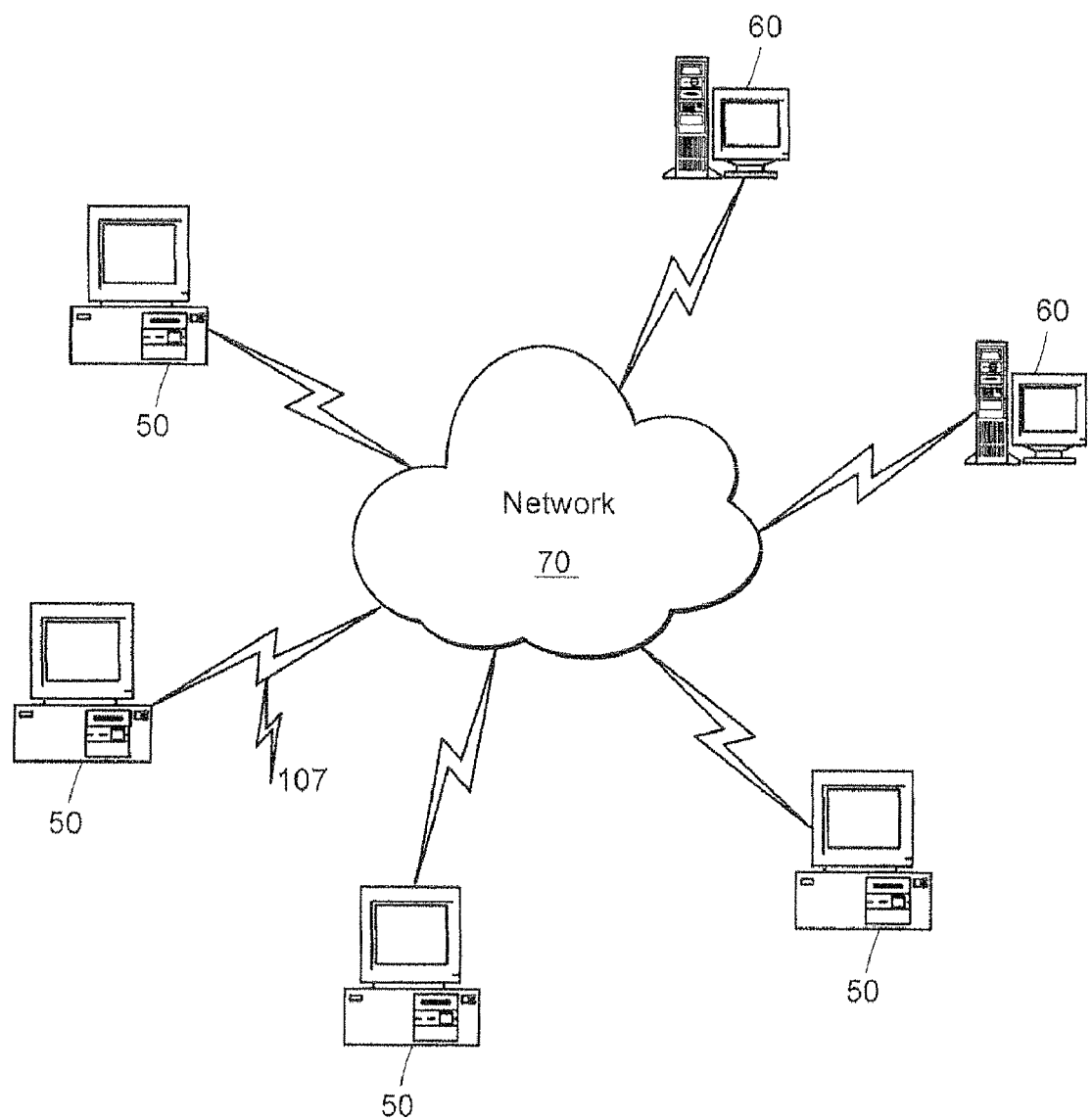
FIGS. 15A and 15B are schematic and block diagrams of computer systems in which embodiments of the present invention are deployed.

FIG. 15A illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 15B:
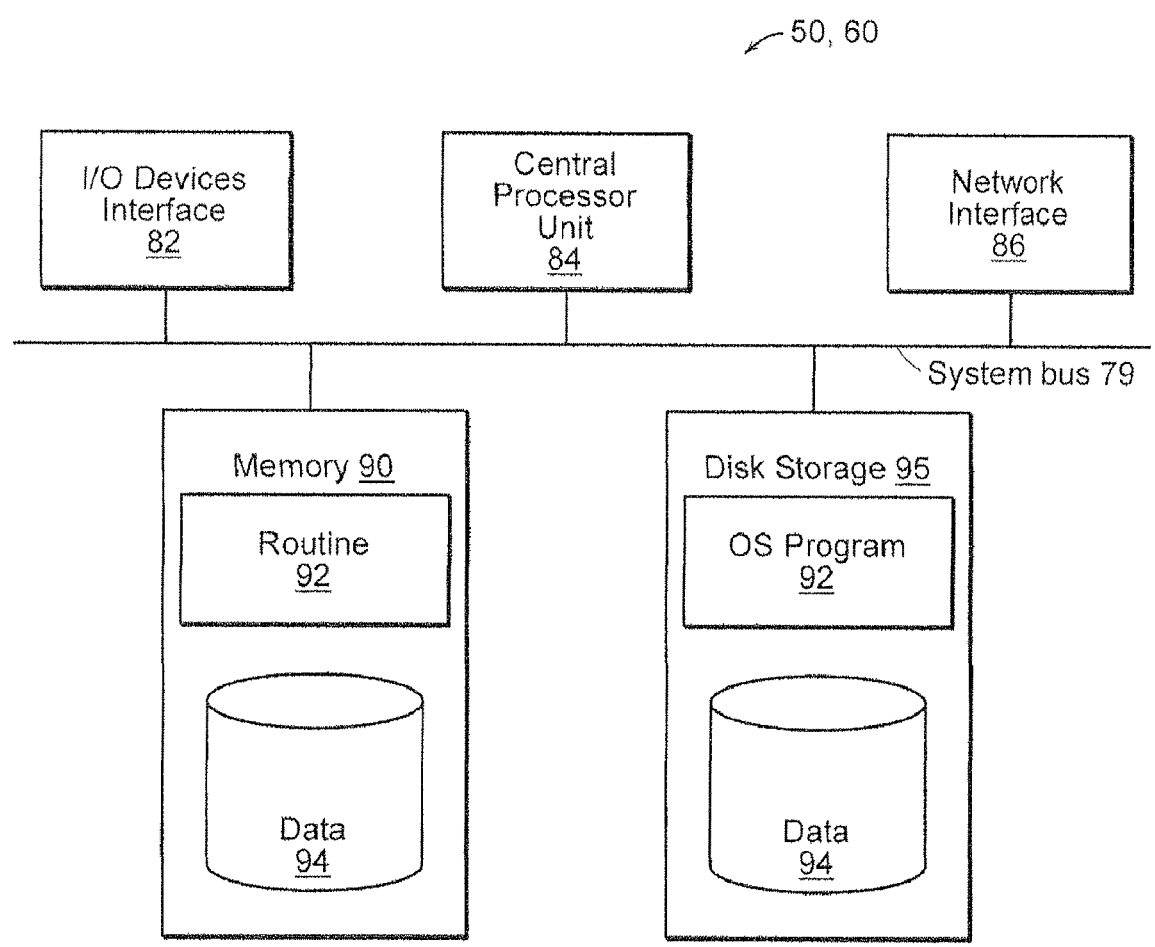

FIG. 15B is a diagram of the internal structure of a computer (e.g., client processor/device 50 or server computers 60) in the computer system of FIG. 15A. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 15A). Memory 90 provides volatile storage for computer software instructions 92 and data 94 used to implement an embodiment of the present invention (e.g., CAD systems employing the invention, the surface design process of FIG. 2, module/assembly computing coupling curve points of FIGS. 13 and 14, objective function module and optimizer, regulation function module, and other supporting code/member or engines detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method of forming a computer-based model of manufacturable product, the method comprising:
   in a hardware processor configured to implement a computer aided design (CAD) system:
      forming a CAD model modeling a subject product, including in the CAD model designing a surface of the subject product that is defined by guiding curves P(u) and Q(v) and a coupling curve s ↦ (t(s),w(s)); and
      improving the manufacture of the subject product as modeled by the formed CAD model and the designed surface by, in the CAD system:
      accessing data, in a memory or disk storage, that defines the guiding curves of the defined surface P(u) and Q(v) and a cost function $f(t,w)$;
      defining an objective function of the type J=J($f$,t,w), involving both the cost function $f(t,w)$ and coordinates t,w of the coupling curve of the designed surface s ↦ (t(s),w(s));
      optimizing said objective function J to obtain a coupling curve of the designed surface s ↦ (t(s),w(s)) of parameter s;
      providing, at a user display, CAD system output of the CAD model including display of the subject product having the designed surface according to the guiding curves P(t(s)) and Q(w(s)), respectively composed with the coordinates t,w of the coupling curve obtained, wherein:
      at the steps of defining and optimizing the objective function, the objective function J=J($f$,t,w) is constrained such that arguments t,w of the cost function $f(t,w)$ are regulated by a regulation function μ; and
      enabling the improved manufacturing of the subject product represented by the CAD system output of the CAD model.

2. The method of claim 1, wherein the forming of the CAD model includes design of a ruled surface defined by the guiding curves P(u) and Q(v) and the coupling curve s ↦ (t(s), w(s)), wherein:
   at the step of providing design of the designed surface, the surface is a ruled surface of the type S(s,λ)=λQ(w(s))+(1−λ)P(t(s)).

3. The method of claim 1 wherein, at the step of defining the objective function, the objective function is defined such that it is independent from the parameterization of the cost function.

4. The method of claim 1 wherein, at the step of defining the objective function, the objective function to be subsequently optimized is of the type $$J(t, w) = \int_0^1 f(t(s), w(s))\mu(t(s), w(s))ds,$$

such that the cost function is regulated by the regulation function μ.

5. The method of claim 4, wherein, at the step of defining the objective function, the objective function defined (S200) is of the type $$J(t, w) = \int_0^1 f(t(s), w(s))\mu(t'(s), w'(s))ds,$$

wherein the coupling curve μ(t',w') involves first derivatives of arguments of the cost function.

6. The method of claim 5, wherein, at the step of defining the objective function, the regulation function μ is a scalar, positively homogeneous function.

7. The method of claim 5 wherein, at the step of optimizing the objective function, the objective function is constrained such that the derivatives involved in the regulation function are both positive, and an increasing coupling curve is implemented.

8. The method of claim 5 wherein, at the step of optimizing the objective function, the optimization is constrained such that:

$$\frac{t'(s)}{\mu(t'(s), w'(s))} \geq \varepsilon \text{ and } \frac{w'(s)}{\mu(t'(s), w'(s))} \geq \varepsilon,$$

wherein ε is a positive threshold.

9. The method of claim 8, wherein, at the step of defining the objective function, the regulation function μ is implemented so as to define a two-dimensional metric.

10. The method of claim 9, wherein, at the step of optimizing the objective function, the optimization is posed as the following minimization problem:
    minJ(t,w);
    t'/μ(t',w')≧ε;and
    w'/μ(t',w')≧ε.

11. The method of claim 1 wherein, at the step of defining the objective function, the regulation function is implemented as a non Euclidian metric function, for example as a function of the type μ(u,v)=|u|+|v|.

12. The method of claim 1 wherein the step of optimizing the objective function makes use of a particle swarm optimization (PSO) algorithm.

13. The method of claim 12 wherein the search space of the PSO algorithm used at the step of optimizing the objective function is restricted to a set of strictly increasing coupling curves.

14. The method of claim 13, wherein the PSO algorithm used at the step of optimizing the objective function is implemented to capture a curve corresponding to a coupling curve, as a hierarchy of n=$2^m$ variables $x_i$∈[0,1], wherein the variables $x_i$ are hierarchical coordinates $x_i$ representing the coupling curve to be captured.

15. The method of claim 14, wherein at the step of optimizing the objective function, the hierarchical coordinates $x_i$ are transformed into Cartesian coordinates ($t_i,w_i$).

16. A computer program product comprising:
   a non-transitory tangible computer readable storage medium having computer readable program code embodied therewith;
   wherein the computer readable program code is configured to implement a computer-based model of a manufacturable product;
   wherein the computer readable program code, when executed by a processor implements a computer aided design (CAD) system forming a CAD model modeling a subject product including in the CAD model designing a surface of the manufacturable product defined by guiding curves P(u) and Q(v) and a coupling curve s ↦ (t(s), w(s)), and improving manufacture of the subject product modeled by the CAD model by:
   accessing data that defines the guiding curves of the designed surface P(u) and Q(v) and a cost function $f(t, w)$ from a memory or disk storage;

defining an objective function of the type J=J(f,t,w), involving both the cost function f(t,w) and coordinates t,w of the coupling curve of the designed surface s↦(t(s),w(s));

optimizing said objective function J to obtain a coupling curve s↦(t(s),w(s)) of parameter s;

providing, at a user display, CAD system output of the CAD model including display of the subject product having the designed surface according to the guiding curves P(t(s)) and Q(w(s)), respectively composed with the coordinates t,w of the coupling curve obtained, wherein:

the objective function is constrained such that arguments t,w of the cost function f(t,w) are regulated by a regulation function μ; and enabling the improved manufacturing of the subject product represented by the CAD system output of the CAD model.

17. The computer program product as claimed in claim 16 wherein the displayed surface is a ruled surface of the type: S(s,λ)=λQ(w(s))+(1−λ)P(t(s)).

18. A computerized system designing a surface, the surface modeling a manufacture object, comprising:

a processor configured to implement a computer aided design (CAD) system to form a CAD model modeling a subject manufacturable object, in the CAD model the object being modeled by a surface:

in the CAD system:

means for accessing data from a computer memory defining guiding curves P(u) and Q(v) of the surface and a cost function f(t,w);

means for defining in the processor an objective function of the type J=J(f,t,w), involving both the cost function f(t,w) and coordinates t,w of the coupling curve of the surface s↦(t(s),w(s));

means for optimizing in the processor said objective function J to obtain a coupling curve of the surface s↦(t(s),w(s)) of parameter s;

means for providing, in a display of the CAD model to a user, display of the subject manufacturable object having the surface according to the guiding curves P(t(s)) and Q(w(s)) of the surface, respectively composed with the coordinates t,w of the coupling curve obtained in the processor, wherein:

the objective function J=J(f,t,w) is constrained such that arguments t,w of the cost function f(t,w) are regulated by a regulation function μ, and enabling the improved manufacturing of the subject manufacturable object represented by the CAD system output of the CAD model.

19. A computerized system as claimed in claim 18 wherein the displayed surface is a ruled surface of the type: S(s,λ)=λQ(w(s))+(1−λ)P(t(s)).

20. A computerized system as claimed in claim 18, wherein the means for optimizing the objective function makes use of a particle swarm optimization (PSO) algorithm.

* * * * *